(12) United States Patent
Schmieder et al.

(10) Patent No.: US 7,309,200 B2
(45) Date of Patent: Dec. 18, 2007

(54) ARRANGEMENT FOR CONNECTING A TUBULAR FIRST COMPONENT TO A SECOND COMPONENT AND METHOD FOR PRODUCING AN ARRANGEMENT OF THIS TYPE

(75) Inventors: Hansjoerg Schmieder, Oberkirch-Zusenhofen (DE); Franz Mayer, Oberkirch (DE); Klaus Schindler, Renchen (DE)

(73) Assignee: PROGRESS-WERK Oberkirch AG, Oberkirch (DE)

( * ) Notice: Subject to any disclaimer, the term of this patent is extended or adjusted under 35 U.S.C. 154(b) by 102 days.

(21) Appl. No.: 11/180,945

(22) Filed: Jul. 13, 2005

(65) Prior Publication Data

US 2006/0013669 A1    Jan. 19, 2006

Related U.S. Application Data

(63) Continuation of application No. PCT/EP03/14276, filed on Dec. 16, 2003.

(30) Foreign Application Priority Data

Jan. 13, 2003    (DE) ............................... 103 01 018

(51) Int. Cl.
*F16B 37/04* (2006.01)
(52) U.S. Cl. .................................. 411/103; 411/111
(58) Field of Classification Search ........ 411/111–113, 411/999, 171, 103; 403/238, 239, 243
See application file for complete search history.

(56) References Cited

U.S. PATENT DOCUMENTS

| | | | | | |
|---|---|---|---|---|---|
| 1,805,460 | A | * | 5/1931 | Carr | ........................... 411/112 |
| 2,567,864 | A | * | 9/1951 | Becker | ....................... 411/112 |
| 2,717,622 | A | * | 9/1955 | Flora | ........................... 411/112 |
| 2,727,552 | A | * | 12/1955 | Chvesta | ....................... 411/112 |
| 2,748,825 | A | * | 6/1956 | Launay | ....................... 411/112 |
| 3,020,947 | A | * | 2/1962 | McKelvey | ................... 411/111 |
| 3,461,937 | A | * | 8/1969 | Finney | ....................... 411/111 |
| 3,695,324 | A | * | 10/1972 | Gulistan | ...................... 411/111 |

(Continued)

FOREIGN PATENT DOCUMENTS

DE    27 04 954    8/1978

(Continued)

*Primary Examiner*—Flemming Saether
(74) *Attorney, Agent, or Firm*—Harness, Dickey & Pierce, P.L.C.

(57) ABSTRACT

An arrangement for connecting a tubular first component to a second component, in particular for connecting a tensioning tube to an A-pillar of a vehicle body, has a first structural element which forms a receptacle for a screw element and is arranged at an end of the first component that faces the second component, and a second structural element which is secured in such a manner at that end of the first component which faces the second component that the first structural element is held between the first component and the second structural element, and the screw element is held by the second structural element in the first structural element in loss-proof fashion, the screw element being movable in the first structural element, at least in a direction transversely with respect to a longitudinal axis of the first component, for compensation of tolerances in the connection of the first component to the second component. Furthermore, a method for producing an arrangement of this type is described.

17 Claims, 3 Drawing Sheets

U.S. PATENT DOCUMENTS

| | | |
|---|---|---|
| 4,271,654 A | 6/1981 | Jungbluth |
| 4,915,533 A | 4/1990 | de la Haye |
| 4,923,347 A * | 5/1990 | Moryl et al. ................. 411/182 |
| 6,146,071 A * | 11/2000 | Norkus et al. ............... 411/104 |

FOREIGN PATENT DOCUMENTS

| | | |
|---|---|---|
| DE | 222 668 A1 | 5/1985 |
| DE | 37 40 401 A1 | 6/1989 |
| DE | 692 00 420 T2 | 3/1995 |
| DE | 195 32 161 C2 | 3/1996 |
| DE | 197 41 551 A1 | 4/1999 |
| DE | 200 17 234 U1 | 4/2001 |
| DE | 100 03 981 A1 | 8/2001 |
| GB | 2 197 417 A | 5/1988 |
| JP | 2001098649 A | 4/2001 |

\* cited by examiner

ARRANGEMENT FOR CONNECTING A TUBULAR FIRST COMPONENT TO A SECOND COMPONENT AND METHOD FOR PRODUCING AN ARRANGEMENT OF THIS TYPE

CROSS REFERENCE TO RELATED APPLICATIONS

The present application is a continuation of pending international patent application PCT/EP2003/014276 filed on Dec. 16, 2003 which designates the United States, which was published in German, and which claims priority of German patent application 103 01 018.1 filed on Jan. 13, 2003.

BACKGROUND OF THE INVENTION

The invention relates to an arrangement for connecting a tubular first component to a second component, in particular for connecting a tensioning tube to an A-pillar of a vehicle body.

The invention furthermore relates to a method for producing an arrangement of this type.

Within the context of the present invention, the terms "tubular first component" and "second component" are to be understood in a general sense. The first component may be a profiled section, in particular a hollow profiled section, which has a lateral surface which is completely continuous in the circumferential direction, or alternatively is partially open. In the latter case, the first component may be, for example, a U or C profiled section or, in general terms, a rectangular profiled section. The first component may usually be a tube with a circular continuous circumference. The second component may be, for example, a profiled section or a plate.

One specific application for the arrangement mentioned at the beginning relates to the connection of a tensioning tube to an A-pillar of a motor vehicle. In motor vehicles, a horizontal cross member on which, inter alia, the instrument panel is secured, usually runs between the essentially vertical A-pillars. In addition to the cross member supporting the instrument panel, below the cross member a tensioning tube may be braced between the two A-pillars. The additional tensioning tube can be used, for example, to prevent the A-pillars from buckling outward in the event of a crash.

Various problems arise when connecting a tensioning tube to the A-pillars of a motor vehicle.

The fundamental problems here are found in tolerances prevailing due to manufacturing inaccuracies, in the requirement for a connection between the tensioning tube and the A-pillars that withstands high tensile forces occurring in the event of a crash, and in a cost-effective design, that is always required in motor vehicles, for the structural elements of the body.

The manufacturing tolerances may manifest themselves in a distance between the A-pillars that is not constant from vehicle to vehicle of the same type of vehicle. Accordingly, these tolerances act in the longitudinal direction of the tensioning tube. However, manufacturing tolerances may also make the connection between the tensioning tube and the A-pillars difficult in directions transversely with respect to the longitudinal direction of the tensioning tube, for example if the securing sections, which are provided on the A-pillars, for the tensioning tube are not precisely in alignment with one another from A-pillar to A-pillar, but rather have an axial or angular offset.

In order to compensate for tolerances in the longitudinal direction of the tensioning tube, connecting elements for connecting a tensioning tube to the A-pillars of a motor vehicle have been proposed, such as, for example, in the document DE 197 41 551 A1, which connecting elements permit a variable compensation of length if the length of the tensioning tube is smaller than the distance between the A-pillars. These known connecting elements have a radially expandable structural element which is introduced into the tensioning tube and is expanded radially against the inner wall of the tensioning tube by a screw connection being tightened. Before clamping takes place, an axially movable spacer piece of the connecting element is moved toward the A-pillar in order to bring about a compensation of length. A problem of these known connecting elements is that the clamping force between the radially expandable clamping piece and the tensioning tube is not sufficient at high tensile forces acting in the longitudinal direction of the tensioning tube in order to reliably prevent the tensioning tube from pulling off from the clamping piece. In addition, these known connecting elements are complex in their production and are associated with relatively high costs.

SUMMARY OF THE INVENTION

The invention is therefore based on the object of providing an arrangement of the type mentioned at the outset which has a simple design and can therefore be produced cost-effectively, ensures a connection of the first component to the second component that withstands high tensile forces, and can compensate for the tolerances in the connection of the first component to the second component.

According to the invention, this object is achieved by an arrangement for connecting a tubular first component to a second component, in particular for connecting a tensioning tube to an A-pillar of a vehicle body, comprising a first structural element which forms a receptacle for a screw element and is arranged at an end of the first component that faces the second component, and with a second structural element which is secured in such a manner to that end of the first component which faces the second component that the first structural element is held between the first component and the second structural element, and the screw element is held by the second structural element in the first structural element in loss-proof fashion, the screw element being movable in the first structural element, at least in a direction transversely with respect to a longitudinal direction of the first component, for compensation of tolerances in the connection of the first component to the second component.

The invention is furthermore based on the object of specifying a cost-effective method for producing an arrangement of this type.

This object is achieved by a method for producing an arrangement for connecting a tubular first component to a second component, in particular for connecting a tensioning tube to an A-pillar of a vehicle body, comprising the following steps:

providing the first component;

providing a first structural element forming a receptacle for a screw element;

inserting the screw element into the first structural element;

providing a second structural element;

arranging the first structural element and the second structural element on an end of the first component that faces the second component;

securing the second structural element in such a manner at that end of the first component which faces the second component that the first structural element is held between the first component and the second structural element, and the screw element is held by the second structural element in the first structural element in loss-proof fashion, the screw element being movable in the first structural element, at least in a direction transversely with respect to a longitudinal direction of the first component, for compensation of tolerances in the connection of the first component to the second component.

The arrangement according to the invention provides a compensation of tolerances in the connection of the first component to the second component by a first structural element being arranged at that end of the first component which faces the second component, which structural arrangement is used as a receptacle for a screw element which is movable in the first structural element, at least in a direction transversely with respect to the longitudinal axis of the first component. In the event of the arrangement according to the invention being used for connecting a tensioning tube to the A-pillars of a motor vehicle, an axial or angular offset between the securing sections of the opposite A-pillars can therefore be compensated for. In addition, the arrangement according to the invention ensures a connection of the first component to the second component that withstands high tensile forces acting in the longitudinal direction of the first component by the second structural element being secured on the first component, for example being welded to the first component, and holding the screw element between it and the first structural element in loss-proof fashion. In contrast to the known connecting elements, in the case of the arrangement according to the invention use is not made of any radially expandable clamping pieces which can slide off from the first component. In addition, the arrangement according to the invention and the method for its production are particularly cost-effective because the first structural element itself does not have to be secured on the first component, for example by welding or bonding, but rather only the second structural element has to be, which is secured on the first component in such a manner that it securely holds the first structural element on the first component, as a result of which, during the production of the arrangement, a working step is saved, namely that of separately securing the screw element receptacle on the first component.

However, it goes without saying that, after the production of the arrangement, the first structural element can likewise be secured on the first component, which, for example, can take place more or less automatically during the securing, for example welding of the second structural element to the end of the first component, if, for example, some of the welding material runs and in the process securely connects the first structural element to the first component and/or the second structural element. However, such a securing of the first structural element on the first component is not absolutely necessary, since the second structural element already securely holds the first structural element on the first component. The first structural element may thus also be entirely fixed on the first component without a cohesive material connection, such as by welding or bonding, i.e. can be fixed solely by the holding force by the second structural element.

Before the first component is connected to the second component, the constructional unit comprising the first component, the first structural element, the screw.element and the second structural element is advantageously premanufactured as a constructional unit. Thus, in the event of the arrangement according to the invention being used to connect a tensioning tube to the A-pillars of a vehicle, a first structural element with the screw element accommodated therein in each case and with a second structural element secured on the tensioning tube can first of all be premanufactured at both ends of the tensioning tube as a constructional unit, with the screw element, for example a nut or screw, then already being held captively, but movably, in the first structural element, which constitutes a further advantage during the subsequent installation of the first component on the second component.

In one preferred refinement of the arrangement, the screw element is movable in the first structural element in any desired directions in a plane transversely with respect to the longitudinal direction of the first component.

In this case, it is advantageous that the arrangement according to the invention can compensate for tolerances in all directions in the plane transversely with respect to the longitudinal direction of the first component.

In a further preferred refinement of the arrangement, the first structural element is held by the second structural element on the first component in a manner essentially secured against rotation.

Since the first structural element does not have to be connected fixedly, for example welded or bonded, to the first component, this measure has the advantage that, during the screwing of the screw element accommodated in the first structural element with a complementary screw element, the first structural element does not undesirably rotate and make a screwing of the two screw elements more difficult or the use of additional tools required. This means of securing against rotation can be brought about by the first structural element being connected to the second structural element with a cohesive material joint, or, as described in a preferred refinement below, by a form-fitting connection between the first structural element and the second structural element.

Furthermore, it is preferred if the first structural element is clamped or set between the first component and the second component.

In this case, it is advantageous that the first structural element is securely held simply and reliably in a form-fitting manner between the second structural element and the first component without requiring a costly and time-consuming further working step, such as welding or bonding, in order to fix the first structural element on the first component.

In a further preferred refinement, the first structural element has at least one flange which extends transversely with respect to the longitudinal direction of the first component, rests on the end side on an edge of the first component and is held against the edge by the second structural element.

In this case, it is advantageous that the first structural element, which accommodates the screw element, is fixed in the longitudinal direction of the first component in a structurally simple manner and without requiring a cohesive material connection of the first structural element to the first component and also without requiring a cohesive material connection of the first structural element to the second structural element. In other words, the first structural element is secured against a displacement into the component and also against pulling off from the first component without use being made for this purpose of radially acting clamping forces which less well withstand high tensile loads.

In a further preferred refinement, there is a recess, in which the flange of the first structural element is accommodated, on a side of the second structural element that faces the first structural element or on the edge of the first component.

If the recess is provided in the second structural element, this has the advantage that the second structural element encloses the flange of the first structural element between the edge of the first component in the manner of a cover, which ensures secure fixing of the first structural element on the first component. The further advantage of this measure is that the first structural element with the screw element accommodated therein and the second structural element can be joined together before the arrangement at the end of the first component, to be precise also without a securing means, such as by welding or bonding, by, for example, lateral projections being formed on the at least one flange of the first structural element and enabling the flange to be latched to the recess at least in such a manner that the first structural element cannot easily fall off the second structural element.

Whereas it is possible, within the context of one of the previously described refinements, according to which a flange extending transversely with respect to the longitudinal direction of the first component is provided on the first structural element, for the flange to extend on the first structural element over the entire circumference, provision is made, in a further preferred refinement, for the flange to extend only over part of the circumference on the first structural element.

It is of advantage in this case that the first structural element can be produced with a lower outlay on material.

In conjunction with a further preferred refinement, according to which the above-described recess in the second structural element extends only over part of the circumference, the further advantage is achieved that the first structural element is at the same time secured against rotation on the second structural element via the flange engaging in the recess over part of the circumference, and, via the securing of the second structural element in the first component, a structurally simple means of securing the first structural element against rotation in relation to the first component is therefore also provided.

In this context, in a structurally preferred refinement of the arrangement, provision is made for the first structural element to have at least two flanges which extend partially around the circumference and are spaced apart from each other in the circumferential direction, preferably by approximately 180°.

In a further preferred refinement, the first structural element has at least one base section which extends transversely with respect to the longitudinal direction of the first component and dips into the first component, wherein one longitudinal section which extends in the longitudinal direction of the first component toward the end of the first component and on its end lying opposite the base section the flange is arranged extends away from the base section.

This measure has the advantage that the first structural element is designed in the manner of a cage in which the screw element can be accommodated movably, and which can be produced as a very cost-effective component with a small outlay on material. If, as is provided in the previously described refinement, the at least one flange extends only over part of the circumference on the first structural element, the at least one longitudinal section of the first structural element also extends only over part of the circumference, to be precise preferably over the same part of the circumference as the at least one flange.

In a further preferred refinement, the screw element is accommodated in the first structural element in a manner secured against rotation.

It is of advantage in this case that, when connecting the first component to the second component by screwing a complementary screw element with the screw element accommodated in the first structural element, the latter screw element does not have to be held in a rotationally fixed manner by a tool, which considerably simplifies the connection of the first component to the second component. The securing of the screw element in the first structural element against rotation may be realized, for example, by the fact that the previously mentioned at least one longitudinal section on the first structural element is used as a rotational stop for the screw element.

In a further preferred refinement of the method according to the invention, before the second structural element is secured at the end of the first component, the first structural element is inserted by means of at least one flange into at least one recess of the second structural element.

In this manner, a preassembly of the first structural element with the screw element accommodated therein on the second structural element is advantageously undertaken, after which this entire arrangement is then secured at the end of the first component, as a result of which the method of production can be carried out with very little expenditure of time because an individual securing of the first and second structural element on the first component and of the first structural element on the second structural element is mainly not required. In particular, it is advantageous, as already described above, if the first structural element and the second structural element can be preassembled in such a manner, to be precise without being connected to one another with a cohesive material joint, that the first structural element and the second structural element are fixed on each other in the manner of a plug-in connection.

Further advantages and features emerge from the description below and the attached drawing.

It goes without saying that the features mentioned above and those which have yet to be explained below can be used not only in the respectively stated combination, but also in other combinations or on their own without departing from the scope of the present invention.

BRIEF DESCRIPTION OF THE DRAWINGS

An exemplary embodiment of the invention is illustrated in the drawing and is described in more detail afterward with reference thereto. In the drawing.

DETAILED DESCRIPTION OF A PREFERRED EMBODIMENT

Figure 1:
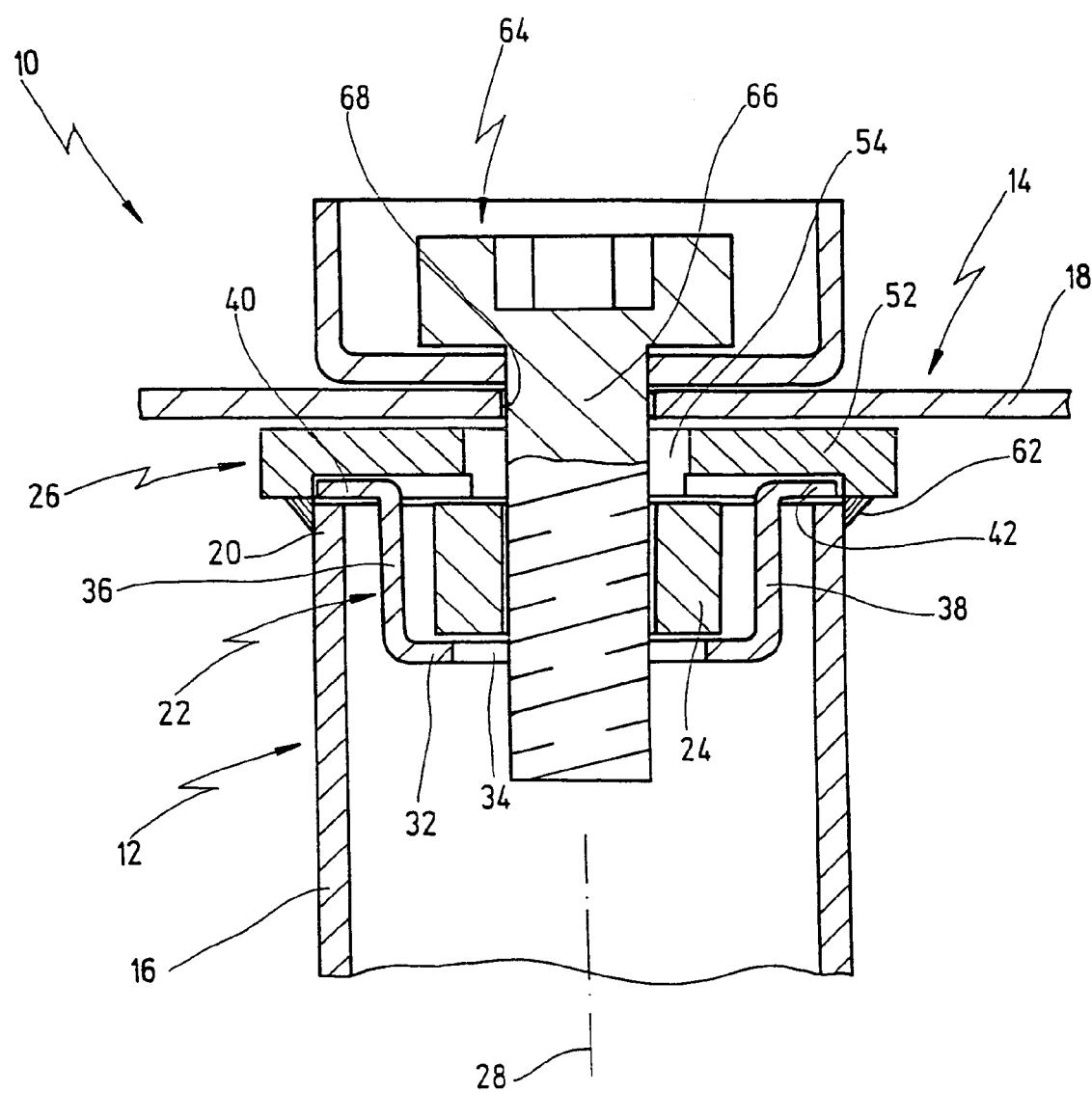
FIG. 1 shows an arrangement for connecting a tubular first component to a likewise illustrated, second component, in longitudinal section, with only part of the first component and second component being illustrated.
Figure 2:
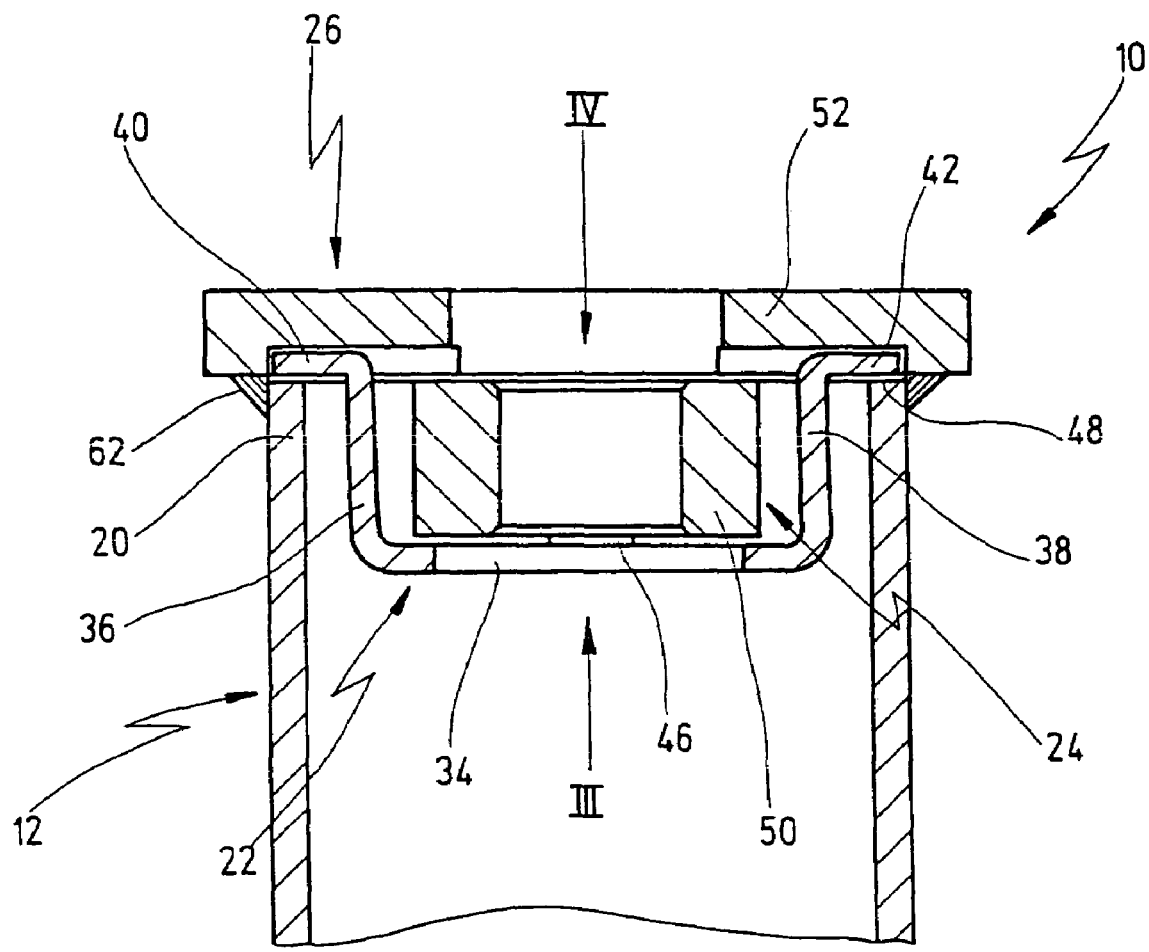
FIG. 2 shows the arrangement in FIG. 1 in a detached position.
Figure 4:
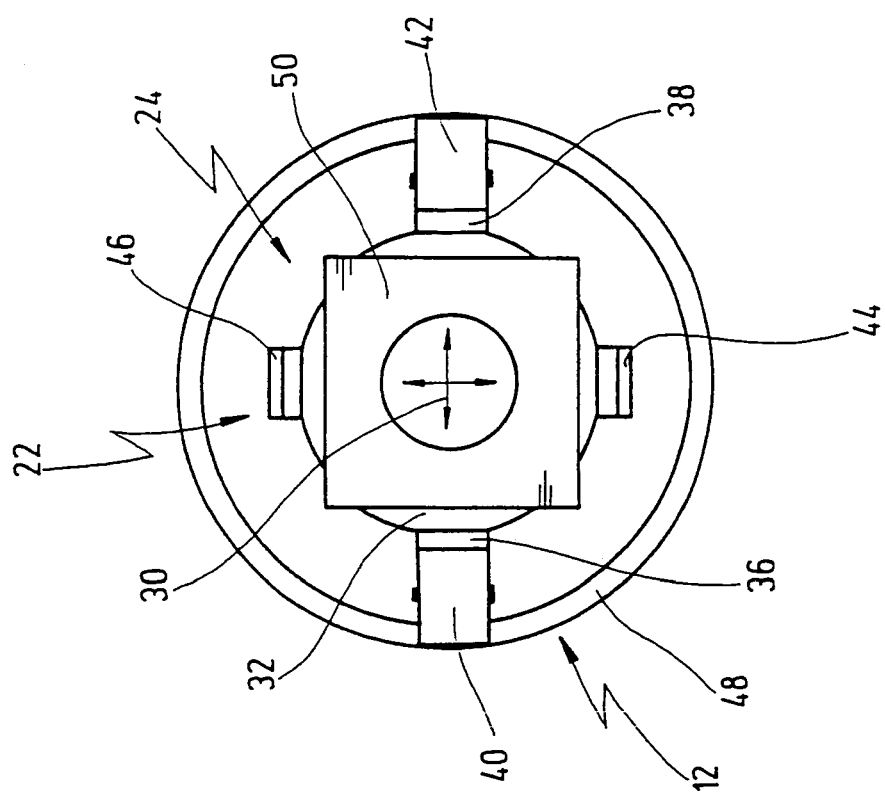
FIG. 4 shows a view of the arrangement in FIG. 2 in the direction of the arrow IV in FIG. 2.
Figure 3:
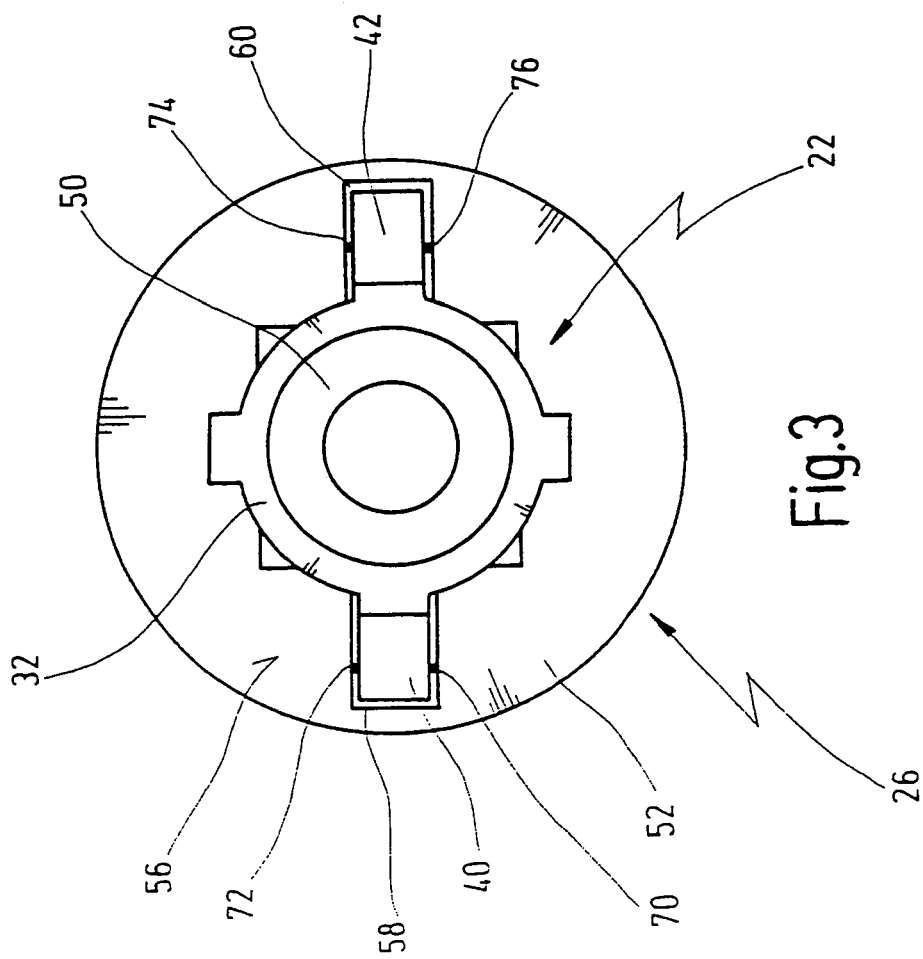
FIG. 3 shows a view of the arrangement in FIG. 2 in the direction of the arrow III.

FIGS. 1 and 2 illustrate an arrangement, which is provided with the general reference number 10, for connecting a tubular first component 12 to a second component 14. Further details of the arrangement 10 are illustrated in FIGS. 3 and 4.

The first component 12, only part of which is illustrated in FIGS. 1 and 2, is, in the present exemplary embodiment, a tensioning tube 16, and the second component 14, which is likewise illustrated partially, is, in the exemplary embodiment shown, an A-pillar 18 of a vehicle body.

It goes without saying that the tensioning tube 16 can be designed in the same manner at its opposite end (not illustrated) in order to connect this end to the A-pillar lying opposite the A-pillar 18.

The first component 12 has an end 20 facing the second component 14. In the region of the end 20, the first component 12 is of tubular design and, in the exemplary embodiment shown, has a circular cross section, or is of cylindrical design.

A first structural element 22 which is used as a receptacle for a first screw element 24 is arranged at the end 20 of the tensioning tube 16.

A second structural element 26 is secured on the first component 12, or put more precisely, at its end 20, in such a manner that the first structural element 22 is held firmly between the first component 12 and the second structural element 26. In this case, the first structural element 22 can be connected fixedly to the first component 12. However, such a cohesive material connection of the first structural element 22 may also be omitted, since the second structural element 26 securely holds the first structural element 22 on the first component 12 in the manner of a sandwich arrangement.

The first screw element 24 is held between the first structural element 22 and the second structural element 26 in loss-proof fashion, but is movable in the first structural element 22 in any desired directions in a plane transversely with respect to the longitudinal direction 28 of the first component 12, as is indicated in FIG. 4 by a double arrow cross 30.

Also with reference to FIGS. 3 and 4, the first structural element 22, the first screw element 24 and the second structural element 26 will be described in greater detail below.

The first structural element 22 has a base section 32 which dips into the end 20 of the first component 12. The base section 32 is of essentially annular design and has an opening 34 in the center.

Extending toward the end 20 of the first component 12 from the base section 32 are two first longitudinal sections 36 and 38 which run essentially parallel to the longitudinal direction 28 of the first component 12 while the base section 32 is arranged essentially transversely with respect to the longitudinal direction 28. The longitudinal sections 36 and 38 may also run obliquely with respect to the longitudinal direction 28 of the first component 12, which is likewise understood under "essentially parallel".

The longitudinal sections 36 and 38 are arranged on the base section 32 in a manner offset from each other by approximately 180° and are connected integrally to said base section. In this case, the longitudinal sections 36 and 38 extend only over part of the circumference, as seen in the circumferential direction. At its end facing away from the base section 32, the longitudinal section 36 has a flange 40 which extends radially outward, and the longitudinal section 38 has a flange 42 which is directed in the opposite direction to the flange 40.

Two further longitudinal sections 44 and 46 which are arranged with respect to the longitudinal sections 36 and 38 in a manner offset with respect to the latter by 90° likewise extend away from the base section 32 toward the end 20 of the first component 12. However, the longitudinal sections 44 and 46 do not have any radially extending flanges at their end facing away from the base section 32.

The entire first structural element 22 with all of the previously described sections and flanges is of integral design.

The flanges 40 and 42 of the first structural element 22 rest on an edge 48 at the end 20 of the first component 12.

The first screw element 24 is designed in the form of a nut 50, the outer circumference of which forms a square, with the result that first screw element 24 is secured against rotation in the first structural element 22 by the longitudinal sections 36, 38, 44 and 46, since the diagonals of the nut 50 are longer than the distance between opposite longitudinal sections 36 and 38 and 44 and 46. "Secured against rotation" means that the nut 50 cannot be rotated at least through 360° about its longitudinal axis in the structural element 22. On the other hand, the first screw element 24 is movable in the first structural element 22 in a plane transversely with respect to the longitudinal direction 28 of the first component 12 in accordance with the double arrow cross 30, as a result of which a compensation of tolerances in any desired directions transversely with respect to the longitudinal direction 28 of the first component 12 is provided in the connection of the first component 12 to the second component 14.

The second structural element 26 is designed in the form of a cover plate 52 which has centrally a continuous hole 54, the diameter of which is smaller than the largest diameter of the first screw element 24, with the result that the screw element 24 is held captively between the second structural element 26 and the first structural element 22 in both directions parallel to the longitudinal direction 28 of the first component 12.

On its side 56 facing the first structural element 22, the second structural element 26 has a first recess 58 and a second recess 60 which are designed in the form of radially extending, flat grooves in which the flanges 40 and 42 of the first structural element 22 are accommodated in a form-fitting manner, as a result of which the first structural element 22 is secured against rotation on the second structural element 26. The recesses 58 and 60, like the flanges 40 and 42, also extend only over part of the circumference.

The cover plate 52 which forms the second structural element 26 has a slightly larger outside diameter than the end 20 of the first component 12, so that the second structural element 26 protrudes slightly over the edge 48 of the first component 12.

In the ready fitted state of the arrangement 10 according to FIG. 1, the second structural element 26 is secured nonreleasably at the end 20 of the first component 12, for example by means of an encircling weld seam 62. In this state, the first structural element 22 is set or clamped between the second structural element 26 and the first component 12 by means of the flanges 40 and 42, and, in the exemplary embodiment shown, is connected fixedly neither to the first component 12 nor to the second component 26, but rather is held solely by a formfitting connection of the second structural element 26 against the first structural element 12. In this case, the first structural element 22 is secured against rotation in relation to the first component 12. However, the weld seam 62 may also, at least partially, fix the first structural element 22 on the first component 12 and/or on the second structural element 26 with a cohesive material joint, if some of the welding material flows into the joint.

A method for producing the arrangement 10 is described below.

First of all, the first component 12 and the first structural element 22 are prepared. The first screw element 24 is then placed into the first structural element 22.

After this, the first structural element 22 is placed together with the flanges 40 and 42 into the recesses 58, 60 of the second structural element 26. A certain degree of fixing of the first structural element 22 on the second structural element 26 can be achieved by there being, for example, as illustrated in FIG. 3, projections 70, 72 and 74, 76 on the flanges 40 and 42, which projections act in the manner of latching lugs and cause, when the flanges 40 and 42 are pressed into the recesses 58 and 60, the flanges 40 and 42 to be clamped in the recesses 58 and 60 in such a manner that the second structural element 22 with the screw element 24 accommodated therein cannot fall off the second structural element 26 if the arrangement of second structural element 26 and first structural element 22 is fitted onto the end 20 of the first component 12.

The second structural element 26 with the first structural element 22 is arranged at the end 20 of the first component 12, as illustrated in FIG. 2. The second structural element 26 is subsequently secured on the first component 12 in such a manner that the first structural element 22 is held against the first component 12 in the longitudinal direction 18 of the first component 12 by the second structural element 26, and the first screw element 24 is held captively in the first structural element 22.

To connect the first component 12 with the arrangement 10 preassembled in this manner to the second component 14, a second screw element 64, which is designed correspondingly as screw 66, is guided through a corresponding opening 68 in the second component 14 and is screwed to the first screw element 24, as a result of which the first screw element 24 pulls against the second structural element 26 and the first component 12 therefore pulls against the second component 14. Since the first screw element 24 is movable in the first structural element 22 in the plane transversely with respect to the longitudinal direction 28, tolerances due to an unintentional axial offset relative to the opposite end (not illustrated) of the first component 12 or a corresponding, opposite, second component can be compensated for in the connection of the first component 12 to the second component 14.

In a modification of the exemplary embodiment shown, the first screw element 24 in the first structural element 22 may also be a screw, the head of which can likewise be designed, for example, as a square, like the nut 50, as a result of which this screw would then be accommodated in the first structural element 22 in a manner secured against rotation. The shank of this screw would then protrude out of the opening 54 of the second structural element 26 before the first component 12 were connected to the second component 14, with the result that, when the first component 12 is connected to the second component 14, a nut can be screwed on to the shank of this screw. The advantage of this alternative refinement would be that the installation or connection of the first component 12 on the second component 14 is facilitated by the screw shank protruding out of the second structural element 26. However, it may be required for the protruding screw shanks to then be able to be inserted into the holes of the A-pillar, for example by there being corresponding grooves thereon.

What is claimed is:

1. An arrangement for connecting a tubular first component to a second component, comprising a screw element, a first structural element forming a receptacle for said screw element and arranged at an end of said first component which end faces said second component, and a second structural element secured to said end of said first component which faces said second component in such a manner that said first structural element is held between said first component and said second structural element, wherein said screw is held by said second structural element in said first structural element in loss-proof fashion, said screw element being movable in the first structural element, at least in a direction transversely with respect to a longitudinal direction of said first component, for compensation of tolerances in the connection of said first component to said second component, further wherein said first structural element has at least one flange which extends transversely with respect to said longitudinal direction of said first component, rests on an end side on an edge of said first component and is held against said edge by said second structural element, and further wherein a recess is present, in which said at least one flange of said first structural element is accommodated, on a side of said second structural element that faces said first structural element.

2. The arrangement of claim 1, wherein said screw element is movable in said first structural element in any desired directions in a plane transversely with respect to said longitudinal direction of said first component.

3. The arrangement of claim 1, wherein said first structural element is held by said second structural element on said first component in a manner essentially secured against rotation.

4. The arrangement of claim 1, wherein said first structural element is set between said first component and said second structural element.

5. The arrangement of claim 1, wherein said recess extends only partially around a circumference in said second structural element.

6. The arrangement of claim 1, wherein said at least one flange extends only partially around a circumference on said first structural element.

7. The arrangement of claim 1, wherein said first structural element has at least two flanges which extend partially circumferentially and are spaced apart from each other in circumferential direction.

8. The arrangement of claim 7, wherein said at least two flanges are spaced apart from each other by approximately 180°.

9. The arrangement of claim 1, wherein said screw element is accommodated in said first structural element in a manner secured against rotation.

10. The arrangement of claim 1, wherein said first component is a tensioning tube, and said second component is an A-pillar of a vehicle body.

11. An arrangement for connecting a tubular first component to a second component, comprising a screw element, a first structural element forming a receptacle for said screw element and arranged at an end of said first component which end faces said second component, and a second structural element secured to said end of said first component which faces said second component in such a manner that said first structural element is held between said first component and said second structural element,
wherein said screw is held by said second structural element in said first structural element in loss-proof fashion, said screw element being movable in the first structural element, at least in a direction transversely with respect to a longitudinal direction of said first component, for compensation of tolerances in the connection of said first component to said second component,
further wherein said first structural element has at least one flange which extends transversely with respect to said longitudinal direction of said first component, rests on an end side on an edge of said first component and is held against said edge by said second structural element, and
further wherein a recess is present, in which said at least one flange of said first structural element is accommodated, on said edge of said first component.

12. The arrangement of claim 11, wherein said recess extends only partially around a circumference in said second structural element.

13. The arrangement of claim 11, wherein said at least one flange extends only partially around a circumference on said first structural element.

14. The arrangement of claim 11, wherein said first structural element has at least two flanges which extend partially circumferentially and are spaced apart from each other in circumferential direction.

15. The arrangement of claim 14, wherein said at least two flanges are spaced apart from each other by approximately 180°.

16. An arrangement for connecting a tubular first component to a second component, comprising
a screw element,
a first structural element forming a receptacle for said screw element and arranged at an end of said first component which end faces said second component, and
a second structural element secured to said end of said first component which faces said second component in such a manner that said first structural element is held between said first component and said second structural element,
wherein said screw is held by said second structural element in said first structural element in loss-proof fashion, said screw element being movable in the first structural element, at least in a direction transversely with respect to a longitudinal direction of said first component, for compensation of tolerances in the connection of said first component to said second component,
further wherein said first structural element has at least one flange which extends transversely with respect to said longitudinal direction of said first component, rests on an end side on an edge of said first component and is held against said edge by said second structural element, and
further wherein said first structural element has a base section which extends transversely with respect to said longitudinal direction of said first component and dips into said first component, wherein at least one longitudinal section which extends in said longitudinal direction of said first component toward said end of said first component and on its end lying opposite said based section said at least one flange extends away from said base section.

17. A method for producing an arrangement for connecting a tubular first component to a second component, comprising the steps of:
providing said first component;
providing a screw element;
providing a first structural element forming a receptacle for said screw element;
inserting said screw element into said first structural element;
providing a second structural element;
arranging said first structural element and said second structural element on an end of said first component that faces said second component;
securing said second structural element in such a manner at said end of said first component which faces said second component that said first structural element is held between said first component and said second structural element, and said screw element is held by said second structural element in said first structural element in loss-proof fashion, said screw element being movable in said first structural element, at least in a direction transversely with respect to a longitudinal direction of said first component, for compensation of tolerances in the connection of said first component to said second component; and
before said second structural element is secured at said end of said first component, inserting by means of at least one flange said first structural element into at least one recess of said second structural element.

* * * * *